US 12,432,558 B2

(12) United States Patent
Amend et al.

(10) Patent No.: US 12,432,558 B2
(45) Date of Patent: Sep. 30, 2025

(54) METHOD AND COMMUNICATION SYSTEM FOR ENSURING SECURE COMMUNICATION IN A ZERO TOUCH CONNECTIVITY-ENVIRONMENT

(71) Applicant: Deutsche Telekom AG, Bonn (DE)

(72) Inventors: Markus Amend, Nidda (DE); Eckard Bogenfeld, Carlsberg (DE); Thomas Henze, Bonn (DE); Katja Hellebrand, Bad Vilbel (DE)

(73) Assignee: DEUTSCHE TELEKOM AG, Bonn (DE)

( * ) Notice: Subject to any disclaimer, the term of this patent is extended or adjusted under 35 U.S.C. 154(b) by 162 days.

(21) Appl. No.: 17/341,400

(22) Filed: Jun. 8, 2021

(65) Prior Publication Data
US 2021/0385656 A1   Dec. 9, 2021

(30) Foreign Application Priority Data
Jun. 9, 2020   (EP) .................................... 20179092

(51) Int. Cl.
*H04W 12/08* (2021.01)
*H04W 12/30* (2021.01)

(52) U.S. Cl.
CPC ........... *H04W 12/08* (2013.01); *H04W 12/30* (2021.01)

(58) Field of Classification Search
CPC ...... H04W 12/08; H04W 12/20; H04L 63/105
USPC .......................................................... 726/4
See application file for complete search history.

(56) References Cited

U.S. PATENT DOCUMENTS

| | | | | |
|---|---|---|---|---|
| 5,935,248 A * | 8/1999 | Kuroda | ............... | H04L 63/0442 726/1 |
| 7,047,407 B2 * | 5/2006 | Itoh | ....................... | H04L 63/105 713/168 |
| 7,506,368 B1 * | 3/2009 | Kersey | ..................... | H04L 9/14 726/12 |
| 7,715,466 B1 * | 5/2010 | Oh | ........................ | H04B 7/022 375/140 |
| 7,984,113 B2 * | 7/2011 | Steinwagner | ........... | H04L 67/02 709/236 |
| 8,156,536 B2 * | 4/2012 | Polk | ................... | H04L 63/0428 713/153 |
| 8,208,614 B2 * | 6/2012 | Suzuki | .................. | G06F 21/445 709/227 |

(Continued)

FOREIGN PATENT DOCUMENTS

EP    2276281 A1    1/2011

*Primary Examiner* — Lynn D Feild
(74) *Attorney, Agent, or Firm* — LEYDIG, VOIT & MAYER, LTD.

(57) ABSTRACT

A method ensures secure communication of a Zero Touch Connectivity-Device (ZTC-Device) in a communication system. The ZTC-Device is configured to communicate with a ZTC-Backend of the communication system by establishing a communication link to the ZTC-Backend via a foreign Wi-Fi hotspot of the communication system. The method includes: locating, by the ZTC-Device, the foreign Wi-Fi Hotspot; identifying the Wi-Fi Hotspot; retrieving a type of trustiness of the Wi-Fi Hotspot based on the identity of the Wi-Fi Hotspot; providing the ZTC-Device and/or the ZTC-Backend with the type of trustiness; and setting, by the ZTC-Device and/or the ZTC-Backend, a security level of the communication link based on the type of trustiness.

16 Claims, 2 Drawing Sheets

(56) References Cited

U.S. PATENT DOCUMENTS

| | | | |
|---|---|---|---|
| 8,307,414 B2* | 11/2012 | Zerfos | H04W 12/069 726/10 |
| 8,458,202 B2* | 6/2013 | Noumeir | G16H 30/20 707/756 |
| 8,856,545 B2* | 10/2014 | Banerjee | G06F 21/00 713/188 |
| 8,943,306 B2* | 1/2015 | Martin | H04L 63/0823 713/172 |
| 9,250,714 B2* | 2/2016 | Hiromi | G01S 7/4913 |
| 9,282,086 B2* | 3/2016 | Klein | H04L 63/105 |
| 9,622,163 B2* | 4/2017 | Chhabra | H04L 45/02 |
| 9,916,275 B2* | 3/2018 | Barzik | G06F 3/0635 |
| 9,954,867 B1* | 4/2018 | Johansson | G06F 21/31 |
| 9,992,683 B2* | 6/2018 | Cronin | H04L 63/105 |
| 10,079,836 B2* | 9/2018 | Klein | H04L 63/08 |
| 10,154,025 B2* | 12/2018 | Tinnakornsrisuphap | H04W 12/068 |
| 10,404,735 B2* | 9/2019 | Jain | H04L 63/1425 |
| 10,452,843 B2* | 10/2019 | Dykes | G06F 21/552 |
| 10,484,391 B2* | 11/2019 | Koch | H04L 63/20 |
| 11,095,802 B2* | 8/2021 | Tan | G06V 10/143 |
| 11,429,243 B2* | 8/2022 | Fleck | G06F 9/451 |
| 11,516,020 B2* | 11/2022 | Yan | H04L 9/3265 |
| 2002/0143650 A1* | 10/2002 | Matsuda | G06Q 30/06 705/26.8 |
| 2003/0054810 A1* | 3/2003 | Chen | H04L 67/303 455/466 |
| 2006/0230279 A1* | 10/2006 | Morris | H04L 9/321 713/182 |
| 2008/0120706 A1* | 5/2008 | Thang | H04L 63/102 726/5 |
| 2008/0267371 A1* | 10/2008 | Shibata | H04L 63/105 379/93.17 |
| 2008/0310371 A1* | 12/2008 | Russell | H04W 36/0066 455/442 |
| 2012/0027374 A1* | 2/2012 | Lipkind | H04N 5/775 386/230 |
| 2012/0159149 A1* | 6/2012 | Martin | H04W 12/069 713/151 |
| 2013/0017780 A1* | 1/2013 | Rose | H04M 3/56 455/41.1 |
| 2014/0185599 A1* | 7/2014 | Vatanapanpilas | H04W 48/20 370/338 |
| 2015/0189511 A1* | 7/2015 | Lapidous | H04L 63/0272 726/15 |
| 2016/0037337 A1* | 2/2016 | Elliott | H04L 63/105 713/168 |
| 2016/0066184 A1* | 3/2016 | Bhargav-Spantzel | H04L 63/105 726/7 |
| 2016/0234202 A1* | 8/2016 | Ahmed | H04W 12/06 |
| 2017/0017952 A1* | 1/2017 | Choi | G06Q 20/326 |
| 2017/0094524 A1* | 3/2017 | Mazzarella | H04L 63/10 |
| 2017/0134171 A1* | 5/2017 | Woxland | H04W 12/086 |
| 2019/0075465 A1* | 3/2019 | Grutzmacher | H04L 63/0876 |
| 2019/0273743 A1* | 9/2019 | Pike | H04L 63/1425 |
| 2020/0077003 A1* | 3/2020 | Tan | H04N 23/20 |
| 2020/0382952 A1* | 12/2020 | Alonso Cebrian | H04W 12/64 |
| 2021/0232384 A1* | 7/2021 | Lewis | H04L 9/0894 |
| 2021/0345112 A1* | 11/2021 | Elliott | H04W 12/08 |
| 2022/0263798 A1* | 8/2022 | Saghir | H04L 63/029 |
| 2022/0295289 A1* | 9/2022 | Lim | H04W 12/08 |
| 2022/0353684 A1* | 11/2022 | Marinho | H04L 45/02 |
| 2023/0344825 A1* | 10/2023 | Freeling | H04L 63/0853 |

* cited by examiner

METHOD AND COMMUNICATION SYSTEM FOR ENSURING SECURE COMMUNICATION IN A ZERO TOUCH CONNECTIVITY-ENVIRONMENT

CROSS-REFERENCE TO PRIOR APPLICATIONS

Priority is claimed to European Patent Application No. EP 20 179 092.0, filed on Jun. 9, 2020, the entire disclosure of which is hereby incorporated by reference herein.

FIELD

The invention relates to a method, communication system and a Zero Touch Connectivity-Device for ensuring secure communication in a Zero Touch Connectivity-Environment.

BACKGROUND

Nowadays, people using smartphones or other mobile devices are typically connected to the Internet via a cellular network of a certain network provider or its roaming partners. This provider normally takes care of all aspects of Internet connectivity, including secure identification, terms of condition management, secure connection management, billing, etc., all fulfilling legal requirements for telecommunication services. These "people" or users are referred as mobile customers.

Mobile customers also have the option to connect to a Wi-Fi network via a Wi-Fi hotspot of their choice, which then provides the connectivity to the Internet, whereas the mobile network can in parallel still deliver voice (telephony) and SMS service.

Major benefits of using Wi-Fi networks for Internet connectivity instead of using mobile networks are cost saving aspects (for volume-based billing data plans), better performance (typically indoors) or the possibility to directly connect to local devices in a private home or company network.

However, today's customers are confronted with different available networks and it is necessary for the user/customer to be involved in managing connectivity to experience the services they really use.

Conventionally, this leads to an inconvenience regarding the customer's experience and may give rise to several problems. For example, when customers are confronted with bad connectivity experience—such as: slow Wi-Fi or cellular connectivity, connection drops, or the service is stalling and does not work at all, the connection is disrupted or is bad—the customers have to manage their connectivity, e.g. by switching the Wi-Fi button on/off to stay connected and use their mobile services or to change the Wi-Fi provider.

As another example, in situations when several networks are available, e.g. several third party Wi-Fis, which are also called foreign Wi-Fis, the customers do not know in advance which Wi-Fi is the best (i.e. in terms of quality, performance). Typically, customers are overwhelmed by decisions they cannot even make because they have no knowledge about quality or safety of available networks.

Existing solutions like Connectivity Steering Apps or embedded device functions help to improve the current usage behavior and reduce customer involvement, but a manual engagement is still required.

Another problem is that the foreign Wi-Fi networks that do not have any relation with the user's cellular provider, hence excluding operator or partner Wi-Fis which allow the customer a seamless access.

A key drawback of using third party Wi-Fi networks today is that the user is on his/her own, because in this use case the user is not in the role of a mobile customer. It follows that significant manual interaction is required before the connection to the Internet is established and applications can be used. Some examples of these manual interactions for enjoying Wi-Fi connectivity, require the user to perform one or more of the following actions:

locate a suitable Wi-Fi network,
decide whether it is secure enough for use (mostly based on "stomach feeling" or on other people recommendations),
login to the network—this often requires inquiring for credentials (a social interaction) and/or registering via a mandatory landing page, which is very common because the Wi-Fi provider wants to pass on legal responsibilities to the user who must explicitly comply to respective terms and conditions,
pay money for the use of the Wi-Fi network,
pay with "attention", e.g. via advertisement pages popping up automatically,
pay with personal data, which are retrieved via the landing page, typically name, surname and email-address, but sometimes even more.

Despite the above-mentioned drawbacks, many customers still decide to use such Wi-Fi networks, mainly for cost reasons—as data volume-based billing still prevails. The situation becomes even more distinct in locations where cellular connectivity is typically more expensive or otherwise limited.

With the rise of data flat rates, more and more customers with such data plans refrain from using Wi-Fi at all. They turn the Wi-Fi setting in their device OFF, in order to not be bothered at all with the hassle and also to save battery.

However, there exists a problem in that these customers could often enjoy a better connectivity than the one they currently have. This occurs whenever there is a Wi-Fi around that could deliver the user a better performance than the used cellular network, typically LTE but partly falling back to 3G or even EDGE.

At the same time the cellular service provider is missing out on the opportunity to offload (flatrate) customers' traffic to a quality Wi-Fi network and thereby saving cellular network cost.

Methods have been proposed that enable a seamless access of a user device to a foreign Wi-Fi network. These methods are described as Zero Touch Connectivity (ZTC) methods because they require no or only minimal user input at all to gain access to the Internet via the foreign Wi-Fi network. As the user device is used in this Zero Touch Connectivity environment, it is also called a Zero Touch Connectivity-Device (ZTC-Device).

Conventionally, these methods concentrate on easy access and neglect security issues to ensure a trusted communication link between the user device. However, secure transmission of data becomes more and more important since the number of transactions over the Internet with critical data increases.

SUMMARY

In an exemplary embodiment, the present invention provides a method for ensuring secure communication of a Zero Touch Connectivity-Device (ZTC-Device) in a communication system. The ZTC-Device is configured to communicate with a ZTC-Backend of the communication system by establishing a communication link to the ZTC-Backend via a foreign Wi-Fi hotspot of the communication system. The method includes: locating, by the ZTC-Device, the foreign Wi-Fi Hotspot; identifying the Wi-Fi Hotspot; retrieving a type of trustiness of the Wi-Fi Hotspot based on the identity of the Wi-Fi Hotspot; providing the ZTC-Device and/or the ZTC-Backend with the type of trustiness; and setting, by the ZTC-Device and/or the ZTC-Backend, a security level of the communication link based on the type of trustiness.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
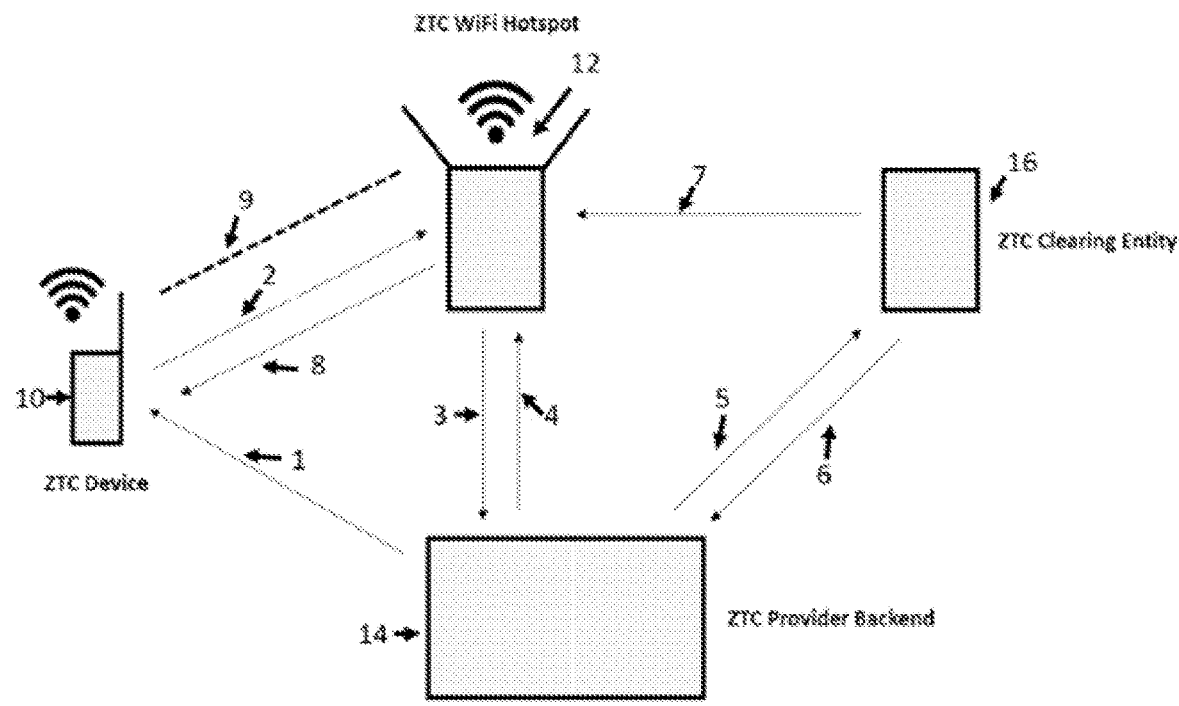
FIG. 1 shows an exemplary embodiment of a Zero Touch Connectivity communication system (ZTC-communication system).

Exemplary embodiments of the present invention provide sufficient security of communication links in a Zero Touch Connectivity-Environment.

The features of the various aspects of the invention described below or the various examples of implementation may be combined with each other, unless this is explicitly excluded or is technically impossible.

According to a first aspect of the invention, the invention provides a method for ensuring secure communication for a Zero Touch Connectivity-Device (ZTC-Device) in a communication system, in particular in a Zero Touch Connectivity communication system, wherein the communication system comprises a ZTC-Device of a user, a foreign Wi-Fi hotspot and a ZTC-Backend, wherein the ZTC-Device is configured to communicate with the ZTC-Backend by establishing a communication link to the ZTC-Backend via the foreign Wi-Fi hotspot, the method comprises the steps of:

locating at least a foreign Wi-Fi hotspot by the ZTC-Device;
this is the typical case when a ZTC-Device searches for accessible Wi-Fi hotspots within its communication range. As the infrastructure of Wi-Fi hotspots is increasing, there is an increasing chance that the ZTC-Device locates more than one foreign Wi-Fi hotspot. The ZTC-Device can then automatically select its preferred Wi-Fi hotspot. This decision making can be implemented on a computing unit of the ZTC-Device.

Identifying the Wi-Fi hotspot;
the identification of the Wi-Fi hotspot is performed so that the Wi-Fi hotspot can be differentiated from other Wi-Fi hotspots. With the help of this identification it is possible to retrieve technical and/or security parameters of the selected Wi-Fi hotspot. The identification of the Wi-Fi hotspot can in principle be done by the ZTC-Device and/or by the ZTC-Backend. Those two devices can store a list of Wi-Fi hotspots in their memory or can contact a trusted server to gain information about the Wi-Fi hotspots. It is also possible that the ZTC-Backend fulfills the function of such a trusted server. For example, the ZTC-Device can contact the trusted server via its cellular communication channel.

Retrieving a type of trustiness of the Wi-Fi hotspot based on the identity of the Wi-Fi hotspot;
information about the type of trustiness of the Wi-Fi hotspot can be a trusted security certificate that can be stored in the memory of the ZTC-Backend or any other trusted authority. The type of trustiness can specify a certain level of trustiness that is assigned to the Wi-Fi hotspot. For example, there could be a high, medium and low level of trustiness the foreign Wi-Fi hotspot. It is to be understood that the high trustiness level is the best regarding the security of the communication.

Providing the ZTC-Device and/or the ZTC-Backend with the type of trustiness;
at least one of the ZTC-Device or the ZTC-Backend need to know the type of trustiness. If the type of trustiness was retrieved by the ZTC-Backend because this information was stored in its memory, then the ZTC-Backend already knows the type of trustiness. It is also possible that the ZTC-Backend transmits this information to the ZTC-Device by establishing a cellular communication link or by using a control plane via the Wi-Fi hotspot. In a similar technical way, the ZTC-Device and/or the ZTC-Backend can be provided with this information, if this information was stored in the other trusted authority. "Passpoint" or "Hotspot 2.0" can be used to manage information about the type of trustiness.

Setting a security level of the communication link by the ZTC-Device and/or the ZTC-Backend based on the type of trustiness.
Both the ZTC-Device and the ZTC-Backend can establish their respective communication link over the Wi-Fi hotspot e.g. by using handshake methods. Hence, they both know about the type of trustiness and can in principle each decide on an appropriate security level to ensure a secure communication channel. For example, there could be a high, medium and low security level. The setting of the appropriate security level can be performed by a computing unit on the ZTC-Device or the ZTC-Backend. Preferably, the ZTC-Device or the ZTC-Backend sets the high security level if the level of trustiness is low, the ZTC-Device or the ZTC-Backend sets the medium security level if the level of trustiness is medium, and the ZTC-Device or the ZTC-Backend sets the low security level if the level of trustiness is high. In principle, the ZTC-Device and the ZTC-Backend can decide on different security levels with respect of the data direction. It is possible that data that is transferred from ZTC-Device to the ZTC-Backend, the so-called "user plane", is not as critical in terms of security like the data sent from the ZTC-Backend to ZTC-Device. In this case, the ZTC-Device could decide on a medium security level while the ZTC-Backend sets a high security level. An example could be when the user asks his bank about his account number. The request does not contain critical information, while the answer of the bank does.

This provides the advantage, that the ZTC-Device can get secure access to the Internet via establishing a secure communication link to the ZTC-Backend via the foreign Wi-Fi hotspot for the user plane. This method can be performed automatically so that no manual interaction of the user on his ZTC-Device is required. The fact that the security level is based on the level of trustiness yields in an appropriate and dynamic security level. As a rule of thumb it can be said that the higher the security level is, the more computational resources of the ZTC-Device needs to be used which shortens the battery's lifetime of the ZTC-Device. However, the battery lifetime is often a critical issue of user equipment like ZTC-Device. Due to the appropriate and dynamic security level, the ZTC-Device sets the level of security for the user plane not higher than necessary to ensure secure communication. Hence, the battery lifetime of the ZTC-Device is significantly longer. In the case that no information about the type of trustiness of the foreign Wi-Fi hotspot is available, the ZTC-Device and/or the ZTC-Backend assume that there is no trust in the communication link/user plane at all and they can therefore apply a high security level.

In an embodiment, the ZTC-Device locates multiple foreign Wi-Fi hotspots, retrieves type of trustiness of each of the multiple Wi-Fi hotspot and selects the most trustworthy Wi-Fi hotspot.

This provides the advantage that the security level, in particular the security level of the user plane, can be set as low as possible because the most trustworthy Wi-Fi hotspot already has implemented security measures that enhance the overall security of the communication link between the ZTC-Device and the ZTC-Backend. In particular, the Wi-Fi hotspot can be a certified ZTC Wi-Fi hotspot. Such a certified ZTC Wi-Fi hotspot guarantees a higher level of trustiness.

Preferably, information about the type of trustiness is stored in the ZTC-Backend, gained from user feedback, gained from Wi-Fi specifications and/or gained from location information.

This provides the advantage that the ZTC-Backend can also serve as a trusted authority or that information about the type of trustiness can be assessed in different ways. For example, if there is no information about the type of trustiness in a trusted authority, it is possible that the user defines such a type of trustiness. This could be the case if the user checks in into the hotel and he has full trust in the local Wi-Fi of the hotel. From the Wi-Fi specifications, the name type of security (WPAx, . . . ) can be assessed. It is also possible to determine which Wi-Fi hotspot is available at a distinct location by using Global Positioning System (GPS), cell-id, Wi-Fi triangulation and/or Service Set Identifiers (SSIDs).

Advantageously, a control plane is established on the communication link to transmit the information about the type of trustiness from the ZTC-Backend to the ZTC-Device via the Wi-Fi hotspot.

In contrast to the user plane, the control plane is to be understood as a communication link in which no critical data concerning the user is being transmitted. It follows that it is no big security issue if data of this control plane is transmitted without high security measures. However, it is in principle possible to apply any security level to the control plane, too. If the ZTC-Device is to set the security level for the user plane, it needs to know about the information about the type of trustiness. If the ZTC-Backend uses the control plane to transfer those data, this has the benefit that no critical user data is transferred along with the information about the type of trustiness. The ZTC-Device then has the necessary data to decide on an appropriate security level of the user plane.

In an embodiment, the information about the type of trustiness is transmitted via a cellular network from the ZTC-Backend to the ZTC-Device.

This provides the advantage that the information about the type of trustiness is transmitted via an alternative channel independent from the Wi-Fi hotspot, so that the information about the type of trustiness cannot be manipulated while it passes through the Wi-Fi hotspot.

In an embodiment, the ZTC-Device and/or the ZTC-Backend sets the security level of the communication link dynamically, wherein the ZTC-Device and/or the ZTC-Backend chooses an appropriate security level out of multiple security levels.

This provides the advantage of an optimal trade-off between security level and user experience. The appropriate security level can also depend on the application that is running on the ZTC-Device. If the user streams video data from a streaming platform when watching films, the ZTC-Device and/or the ZTC-Backend can decide that in this case the security level can be lower than if the user is transmitting banking account data. The security level can dynamically adjusted, in particular increased, if the user initially runs an application on his ZTC-Device that is not critical concerning data fraud and then switches to a "data-critical" application, in particular a banking application.

In an embodiment, the multiple security levels include a low security level with no additional security measures at all, a medium security level with additional security measures and a high security level with tunneling security measures. The case of no security measures at all is chosen due to the full trusted environment between the ZTC-Device, the foreign Wi-Fi hotspot and the ZTC-Backend. The high security level is chosen if there is no trust in the ZTC communication environment. Those measures can comprise end-to-end (E2E) security between the ZTC-Device and the ZTC-Backend by encrypted authenticated tunneling methods. The medium security level is chosen if there is a medium trust in the ZTC communication environment. Those measures can comprise encrypting TCP data packets or using the QUIC (Quick UDP (User Datagram Protocol) Internet Connection)-protocol. Of course, the number of security levels is in principle not limited.

This also provides the advantage of an optimal trade-off between security level and user experience.

In an embodiment, the security level is set by a user on his ZTC-Device.

This provides the advantage that the user can directly control the performance, in particular the battery lifetime and the Internet access, of his user equipment.

The communication link can comprise an access link that enables data traffic from the ZTC-Device to the Wi-Fi hotspot, and a backend link that enables data traffic from the Wi-Fi hotspot to the ZTC-Backend, and wherein different security levels can be set on the access link and the backend link, respectively. For example the type of Wi-Fi encryption (WPAx, WEP, . . . ) could be considered as a valid measure to secure the access link. The separation of the communication link into the access link and the backend link might require a tunnel from the Wi-Fi hotspot to the ZTC-Backend.

This provides the advantage that the security levels are even more tailored to the specific demands. For example, it might be the case that the backend link is a landline, which is typically more secure than a radio access network. In this case, one could assign higher security level to the access link than to the backend link. In contrast, if the access link is more secure than the backend link, one could assign a lower security level to the access link which yields in enhanced battery performance of the ZTC-Device.

According to a second aspect of the invention, the invention provides a communication system, in particular a Zero Touch Connectivity communication system, for ensuring secure communication for a ZTC-Device configured to perform the steps according to a method described above, wherein the communication system comprises
- a ZTC-Device configured to locate Wi-Fi hotspots and to identify the located Wi-Fi hotspot;
- a foreign Wi-Fi hotspot;
- a ZTC-Backend configured to store information about a type of trustiness of Wi-Fi hotspots, the information about a type of trustiness can be stored in a memory unit of the ZTC-Backend;

wherein the ZTC-Device and/or the ZTC-Backend are configured to establish a communication link via the foreign Wi-Fi hotspot, and wherein the ZTC-Device and/or the ZTC-Backend are configured to exchange information about the type of trustiness of Wi-Fi hotspots via the communication link and/or via a cellular link, wherein the ZTC-Device and/or the ZTC-Backend are configured to set a security level of the communication link based on the type of trustiness.

This provides the advantage that the ZTC-Device can get secure access to the Internet via establishing a secure communication link to the ZTC-Backend via the foreign Wi-Fi hotspot for the user plane. This communication system can automatically perform all the necessary steps so that no manual interaction of the user on his ZTC-Device is required. The fact that the security level is based on the level of trustiness yields an appropriate and a dynamic security level. As a rule of thumb it can be said that the higher the security level is, the more computational resources of the ZTC-Device needs to be used which shortens the battery's lifetime of the ZTC-Device and/or lower the data throughput. However, the battery lifetime is often a critical issue of user equipment like ZTC-Device. Due to the appropriate and dynamic security level, the ZTC-Device sets the level of security for the user plane not higher than necessary to ensure secure communication. Hence, the battery lifetime of the ZTC-Device is significantly longer and the maximum data throughput can be ensured.

According to a third aspect of the invention, the invention provides a method for ensuring secure communication of a Zero Touch Connectivity-Device (ZTC-Device) in a Zero Touch Connectivity-Environment, the method comprising the following steps performed by the ZTC-Device:
- locating at least a foreign Wi-Fi hotspot;
- Receiving and/or accessing information about a type of trustiness of the Wi-Fi hotspot. The ZTC-Device can receive the information about the type of trustiness in principle by various channels—even by manual user input. It is also possible that decision rules or tables are stored inside the memory of the ZTC-Device that enables the device to access or estimate the type of trustiness of the Wi-Fi hotspot;
- Setting a security level of the communication link associated with the Wi-Fi hotspot based on the type of trustiness.

This provides the advantage that the ZTC-Device can get secure access to the Internet via establishing a secure communication link by its own decision rules implemented on the computing unit of the ZTC-Device. It is even possible that the user specifies to which degree the ZTC-Device applies its security measures. For example, if the ZTC-Device runs low on battery lifetime, the user could decide to apply less strict security measures for the communication link. On the other hand, if the user has access to energy sources, he could decide to apply stricter security measures for the communication link. A further advantage is that this provides maximum flexibility for the user.

In an embodiment, the ZTC-Device identifies the foreign Wi-Fi hotspot.

This provides the advantage, that the ZTC-Device is even more independent in the whole process of setting appropriate security measures.

According to a fourth aspect of the invention, the invention provides a ZTC-Device for ensuring secure communication for a ZTC-Device configured to perform the steps according to a method according to the third aspect of the invention, wherein the ZTC-Device comprises
- a network interface configured to exchange data according to at least a Wi-Fi and/or a cellular communication standard,
- a computing unit configured to establish a communication link with a Wi-Fi hotspot, wherein
- the computing unit is configured to set a security level of a Wi-Fi communication based on a type of trustiness of the Wi-Fi hotspot.

In the following, numerous features of the present invention are explained in detail via exemplary embodiments. The present disclosure is not limited to the specifically depicted combinations of features. Rather, the features mentioned here can be combined in different ways in other embodiments, unless this is expressly excluded below.

FIG. 1 illustrates steps of a communication flow of a ZTC-communication system to gain access to the Internet. The invention can be performed in parallel, after or independently to those steps.

Step 1: Registration: When registering a user device 10, in particular a ZTC-Device 10, for a ZTC service, the ZTC-Backend 14 supplies a unique, secure ID, which defines how it can be reached by foreign Wi-Fi hotspots 12, in particular ZTC Wi-Fi hotspots 12—the ZTC Wi-Fi hotspots 12 are Wi-Fi hotspots that are certified by the trusted ZTC-Backend 14. The unique ID can be (derived from) an international mobile subscriber identity (IMSI), stored in a subscriber identification module (SIM) card supplied to the ZTC-Device 10 manually or in an eSIM profile downloaded by the user to the ZTC-Device 10. It can also be any other kind of unique and secure data item defined for that purpose. Whereas the unique ID is permanent, the secure link can be updated over-the-air during the lifetime of the ZTC-Device 10 and the ZTC service respectively.

Step 2: Access Service Request: On detection of an available ZTC Wi-Fi hotspots 12 by the ZTC-Device 10, it sends a request to the ZTC Wi-Fi hotspot 12 containing its unique ID (e.g. IMSI) as well as the secure link to its serving provider ZTC-Backend 14.

Step (3) Access Service Offer: The ZTC Wi-Fi hotspot 12 contacts the ZTC-Backend 14 of the requesting user via the provided link. It sends the received unique ID and optional further parameters such as:
- certificate of security of the hotspot,
- the required terms & conditions,
- other general hotspot characteristics, requested usage fee and a billing reference (e.g. a PayPal address, . . . ), requested alternative benefits such as user insights provisioning or Wi-Fi proximity service enabling, to the ZTC-Backend 14. The ZTC-Backend 14 checks and verifies the data and decides on whether to accept the service offer of the ZTC Wi-Fi hotspot 12.

Step 4: Access Service Acceptance: The ZTC-Backend 14 confirms to the ZTC Wi-Fi hotspot 12:

that the service incl. the requested usage fee (and/or other benefits) delivery is accepted, and the respective process will be triggered (Note: further iterations for usage fee negotiations are possible, i.e. service is accepted for a proposed fee xyz. The ZTC Wi-Fi hotspot 12 can accept or reject the counter-offer, and so on until one party rejects.), that the user is an eligible customer and the ZTC-Backend 14 takes over all respective responsibilities. As an option, the hotspot may now decide to directly continue with step 8.

Step 5: Payment: The ZTC-Backend 14 may trigger payment based on the received reference towards a ZTC Clearing entity 16. It can also refer to an existing bulk payment transaction for that ZTC Wi-Fi hotspot 12 or a group of ZTC Wi-Fi hotspots 12.

Step 6: Payment acceptance: The ZTC Clearing entity 16 accepts the payment and in addition confirms that the ZTC Wi-Fi hotspot 12 is not eligible and not blacklisted for any reason.

Step 7: Payment information: The ZTC Clearing entity 16 informs the ZTC Wi-Fi hotspot 12 about the incoming payment Step 8: Access granted: The ZTC Wi-Fi hotspot 12 informs the ZTC-Device 10 about the granted access and assists the ZTC-Device 10 to connect.

Step 9: Online: The ZTC-Device 10 is online via the ZTC Wi-Fi hotspot 12.

In an exemplary embodiment, a trusted communication link is generated between the ZTC-Device 10 and the ZTC-Backend 14 via the ZTC Wi-Fi hotspot 12 for a user plane (sometimes also referred to as a "data plane" or a "forwarding plane") traffic.

Figure 2:
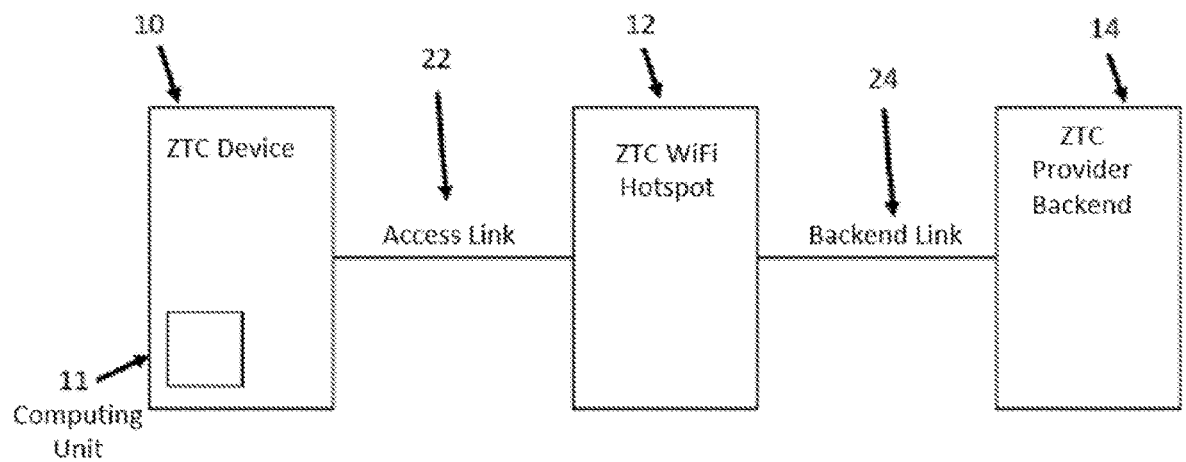
FIG. 2 shows a link segmentation of the ZTC-communication system of FIG. 1.

FIG. 2 shows a link segmentation of the ZTC-communication system of FIG. 1. The communication link between the ZTC-Device 10 and the ZTC-Backend 14 can be subdivided into an access link 22 that is established between the ZTC-Device 10 and the ZTC Wi-Fi hotspot 12 and a backend link 24 that is established between the ZTC Wi-Fi hotspot 12 and the ZTC-Backend 14.

In an exemplary embodiment, an additional and configurable security layer ensures sufficient protection of user plane traffic between ZTC-Device 10 and ZTC-Backend 14 over 3rd party Wi-Fis 12 without putting unnecessary computational overhead to the ZTC-Device 10. This includes the ZTC-Backend 14 and/or the ZTC-Device 10 being aware of the type of trustiness of the user plane between the ZTC-Device 10 and the ZTC backend 14.

Typically, the type of trustiness of the user plane is associated with the type of trustiness of the foreign Wi-Fi hotspot 12. In case that there is no information about the type of trustiness is available, it is assumed that the user plane is totally unsecure so that the security level is set to a high-level.

The information about trustiness may be stored in the ZTC provider backend 14 and negotiated as part of a contract between a foreign Wi-Fi hotspot 12 hotspot operator and ZTC provider. Furthermore, it might be known from user feedback, Wi-Fi specific information (e.g. type of security WPAx, . . . ), location (GPS, cell-id, Wi-Fi triangulation, SSIDs), etc.

According to FIG. 1, a control plane between ZTC device 10 and ZTC backend 14 over the Wi-Fi hotspot 12 may be established before access is granted to exchange information about the link trustiness level. It is also possible that the control plane is a cellular control plane without using the Wi-Fi hotspot 12.

The control plane may be superfluous when the ZTC device 10 already knows the trustiness level of the individual Wi-Fi hotspot 12, can gain this information over a second existing connection to the ZTC backend 14, e.g. via cellular, or can negotiate trustiness after being granted access.

In case the trustiness of the access link 22 and/or the backend link 24 of the user plane link as depicted in FIG. 2 is known/gained, the following decisions for a secure user plane can made by the ZTC device 10 and/or the ZTC backend 14:

i. No security measures at all due to full trusted environment between ZTC device 10 and ZTC-Backend 14;

ii. E2E security between ZTC device 10 and ZTC-Backend 14;

iii. Access link 22 security between ZTC device 10 and ZTC-Backend 14, this is the case when there is more trust in the backend link 24 than in the access link 22. A possible security measure can be that the ZTC device 10 is only allowed to send WPA2-encrypted data to the Wi-Fi hotspot 12. Possible combinations of the security levels are:

a. low security level on the backend link 24 and medium security level on the access link 22;

b. medium security level in the backend link 24 and high security level in the access link 22;

iv. Backend link 22 security between Wi-Fi hotspot 12 and the ZTC-Backend 14 on behalf of the ZTC-Device 10. This is the case when there is less trust in the backend link 24 than in the access link 22. Possible combinations of the security levels are:

a. low security level on the access link 22 and medium security level in the backend link 24;

b. medium security level on the access link 22 and high security level on the backend link 24.

Option iv. can also be used to provide one secured backend link 24 to multiple ZTC-Devices 10 connected to the Wi-Fi hotspot 12. Furthermore, this option fully offloads any computation overhead from the ZTC-Device 10 for security to the Wi-Fi hotspot 12, which has e.g. typically no energy constraints.

Further segmentation beyond FIG. 2 is possible and extends the number of possible options.

In a further step the extent of security from highest to weak security can be negotiated between the ZTC-Device 10 and the ZTC-Backend 14 and can be configured to keep a proper tradeoff between resource footprint and required security.

In still a further step the energy level in the ZTC-Device 10 can be considered to find a proper tradeoff between security level and user experience.

Figure 3:
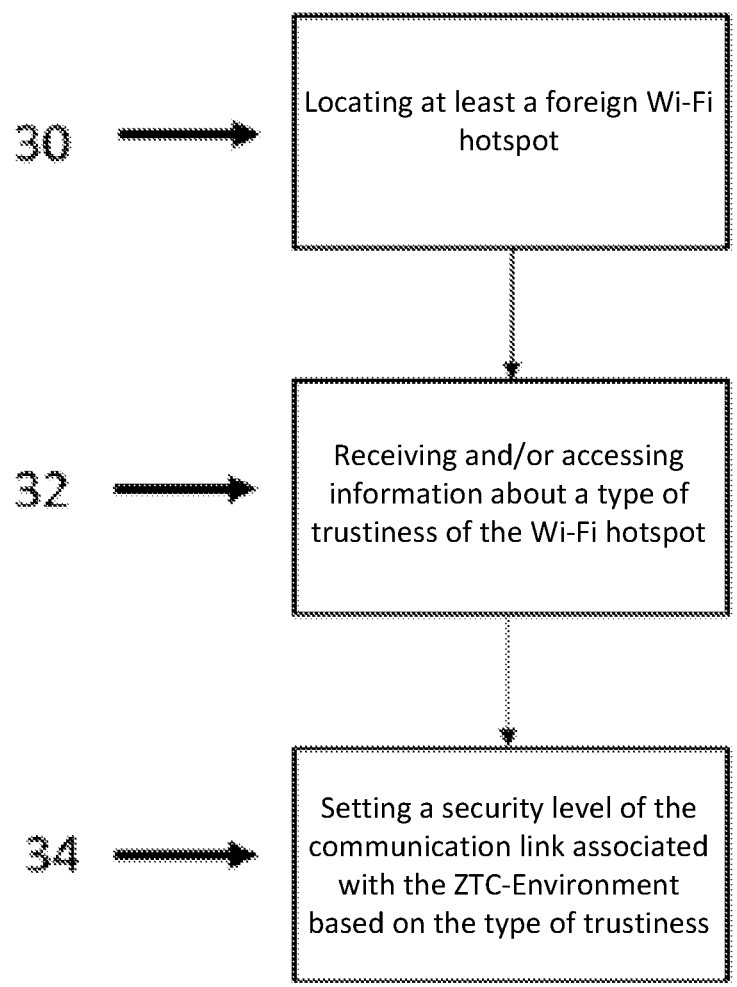
FIG. 3 shows a process implemented on a computing unit of an ZTC-Device.

FIG. 3 shows a process implemented on a computing unit 11, in particular a processor, of the ZTC-Device 10.

Step 30: locating at least a foreign Wi-Fi hotspot.

Step 32: Receiving and/or accessing information about a type of trustiness of the Wi-Fi hotspot.

Step 34: Setting a security level of the communication link associated with the Zero Touch Connectivity-Environment based on the type of trustiness.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for ensuring secure communication of a Zero Touch Connectivity-Device (ZTC-Device) in a communication system, the method comprising:
   locating, by the ZTC-Device, a plurality of foreign Wi-Fi hotspots;
   determining, by the ZTC-Backend, respective types of trustiness of the plurality of foreign Wi-Fi hotspots based on respective identities of the respective foreign Wi-Fi hotspots;
   selecting, by the ZTC-Device, a foreign Wi-Fi hotspot of the plurality of foreign Wi-Fi hotspots for establishing a communication link to the ZTC-Backend, wherein the selected foreign Wi-Fi hotspot is selected from among the plurality of foreign Wi-Fi hotspots based on the selected foreign Wi-Fi hotspot being the most trustworthy foreign Wi-Fi hotspot among the plurality of foreign Wi-Fi hotspots, and wherein the communication link includes:
      an access link between the ZTC-Device and the selected foreign Wi-Fi hotspot; and
      a backend link between the selected foreign Wi-Fi hotspot and the ZTC-Backend; and
   dynamically setting, by the ZTC-Device and/or the ZTC-Backend, a first security level for the backend link of the communication link and a second security level for the access link, wherein the first security level for the backend link is different than the second security level for the access link, and wherein the ZTC-Device and/or the ZTC-Backend chooses the first and second security levels based on respective link types of the backend and access links and further based on content to be transmitted over the communication link;
   wherein the access link between the ZTC-Device and the selected foreign Wi-Fi hotspot is a Wi-Fi link which is dynamically set to be secured via Wi-Fi encryption, and wherein the backend link between the selected foreign Wi-Fi hotspot and the ZTC-Backend is a landline link which is dynamically set to be secured via a tunnel between the selected foreign Wi-Fi hotspot and the ZTC-Backend.

2. The method of claim 1, wherein information about the type of trustiness of the selected foreign Wi-Fi hotspot is stored in the ZTC-Backend, gained from user feedback, gained from Wi-Fi specifications, and/or gained from location information.

3. The method of claim 2, wherein a control plane is established on the communication link to transmit the information about the type of trustiness of the selected foreign Wi-Fi hotspot from the ZTC-Backend to the ZTC-Device via the selected foreign Wi-Fi hotspot.

4. The method of claim 2, wherein the information about the type of trustiness of the selected foreign Wi-Fi hotspot is transmitted via a cellular network from the ZTC-Backend to the ZTC-Device.

5. The method of claim 1, wherein the multiple security levels include a low security level with no additional security measures, a medium security level with additional security measures, and a high security level with tunneling security measures.

6. A communication system for ensuring secure communication of a Zero Touch Connectivity-Device (ZTC-Device), wherein the communication system comprises:
   the ZTC-Device, wherein the ZTC-Device is configured to locate a plurality of foreign Wi-Fi hotspots; and
   a ZTC-Backend configured to determine respective types of trustiness of the plurality of foreign Wi-Fi hotspots based on respective identities of the foreign Wi-Fi hotspots;
   wherein the ZTC-Device is configured to select a foreign Wi-Fi hotspot of the plurality of foreign Wi-Fi hotspots, wherein the selected foreign Wi-Fi hotspot is selected from among the plurality of foreign Wi-Fi hotspots based on the selected foreign Wi-Fi hotspot being the most trustworthy foreign Wi-Fi hotspot among the plurality of foreign Wi-Fi hotspots;
   wherein the ZTC-Device and/or the ZTC-Backend are configured to establish a communication link via the selected foreign Wi-Fi hotspot, wherein the communication link includes:
      an access link between the ZTC-Device and the selected foreign Wi-Fi hotspot; and
      a backend link between the selected foreign Wi-Fi hotspot and the ZTC-Backend;
   wherein the ZTC-Device and/or the ZTC-Backend are configured to exchange information about the type of trustiness of the selected foreign Wi-Fi hotspot via the communication link and/or via a cellular link;
   wherein the ZTC-Device and/or the ZTC-Backend are configured to dynamically set a first security level for the backend link of the communication link and a second security level for the access link, wherein the first security level for the backend link is different than the second security level for the access link:
   wherein the ZTC-Device and/or the ZTC-Backend are configured to choose the first and second security levels based on respective link types of the backend and access links and further based on content to be transmitted over the communication link;

wherein the access link between the ZTC-Device and the selected foreign Wi-Fi hotspot is a Wi-Fi link which is dynamically set to be secured via Wi-Fi encryption, and wherein the backend link between the selected foreign Wi-Fi hotspot and the ZTC-Backend is a landline link which is dynamically set to be secured via a tunnel between the selected foreign Wi-Fi hotspot and the ZTC-Backend.

7. A Zero Touch Connectivity-Device (ZTC-Device) for ensuring secure communication in a Zero Touch Connectivity-Environment, wherein the ZTC-Device comprises:
   a network interface configured to exchange data according to a Wi-Fi standard and/or a cellular communication standard; and
   a processor configured to:
      locate a plurality of foreign Wi-Fi hotspots having respective types of trustiness associated therewith based on respective identities of the foreign Wi-Fi hotspots;
      select a foreign Wi-Fi hotspot of the plurality of foreign Wi-Fi hotspots, wherein the selected foreign Wi-Fi hotspot is selected from among the plurality of foreign Wi-Fi hotspots based on the selected foreign Wi-Fi hotspot being the most trustworthy foreign Wi-Fi hotspot among the plurality of foreign Wi-Fi hotspots; and
      dynamically set a security level of a communication link associated with the selected foreign Wi-Fi hotspot, wherein the security level is chosen out of multiple security levels;
   wherein the communication link includes:
      an access link between the ZTC-Device and the selected foreign Wi-Fi hotspot; and
      a backend link between the selected foreign Wi-Fi hotspot and the ZTC-Backend;
   wherein setting the security level of the communication link dynamically includes, dynamically setting a first security level for the backend link and a second security level for the access link, wherein the first security level for the backend link is different than the second security level for the access link;
   wherein the ZTC-Device is configured to choose the first and second security levels based on respective link types of the backend and access links and further based on content to be transmitted over the communication link;
   wherein the access link between the ZTC-Device and the selected foreign Wi-Fi hotspot is a Wi-Fi link which is dynamically set to be secured via Wi-Fi encryption, and wherein the backend link between the selected foreign Wi-Fi hotspot and the ZTC-Backend is a landline link which is dynamically set to be secured via a tunnel between the selected foreign Wi-Fi hotspot and the ZTC-Backend.

8. The ZTC-Device of claim 7, wherein the processor is further configured to identify the selected foreign Wi-Fi hotspot.

9. The method of claim 1, wherein dynamically setting the security level of the communication link includes determining that the content to be transmitted contains critical information, and setting the security level of the communication link such that the content to be transmitted is communicated at a higher security level than content that does not contain critical information.

10. The method of claim 9, wherein the content that does not contain critical information corresponds to data from a streaming platform, and the content that contains critical information corresponds to banking account data.

11. The method of claim 9, wherein the first content corresponds to user plane data transferred from the ZTC-Device to the ZTC-Backend, and wherein the second content corresponds to data sent from the ZTC-Backend to the ZTC-Device.

12. The method of claim 1, wherein the selected foreign Wi-Fi hotspot is a certified ZTC Wi-Fi hotspot that has been certified by the ZTC-Backend.

13. The method of claim 9, wherein the content that does not contain critical information corresponds to a request for banking information, and the content that contains critical information corresponds to a response to the request for banking information.

14. The method of claim 1, wherein a respective type of trustiness for a respective foreign Wi-Fi hotspot corresponds to a security certificate for the respective foreign Wi-Fi hotspot, wherein the security certificate is stored in a memory of the ZTC-Backend or of another trusted authority.

15. The communication system of claim 6, wherein the backend link supports connections from multiple ZTC-Devices to the selected foreign Wi-Fi hotspot.

16. The communication system of claim 6, wherein, based on the second security level for the access link, the ZTC-device is only permitted to send encrypted data to the selected foreign Wi-Fi hotspot.

* * * * *